United States Patent Office 3,442,703
Patented May 6, 1969

3,442,703
PLURAL COATED ELECTRICAL CONDUCTOR
Arthur B. Naselow, Philadelphia, Pa., assignor to E. I. du Pont de Nemours and Company, Wilmington, Del., a corporation of Delaware
No Drawing. Filed Dec. 6, 1965, Ser. No. 511,972
Int. Cl. B44d 1/18, 1/28, 1/42
U.S. Cl. 117—218                    6 Claims

ABSTRACT OF THE DISCLOSURE

An article coated with multiple resin layers with (A) at least one coating layer consisting essentially of a cured polyamide-imide, and (B) at least one coating layer consisting essentially of a polyimide formed by curing a condensation product of a dianhydride of pyromellitic acid and oxydianiline.

---

This invention relates to insulated wires and more particularly to wires insulated with multiple coats of polyamide-imide and polyimide resin compositions.

It is well known to insulate wire and other articles, metal and non-metal, by coating them with enamels and varnishes and there has been a continuous effort to upgrade the quality of these coatings to withstand severe conditions with respect to temperature, electrical overload, flexibility, cut-through, abrasion and the like. Articles used in space exploration particularly require coatings capable of enduring adverse climatic and environmental conditions. Although certain resins such as polyimides and polyesters have a wide variety of properties useful in coatings yet no single resin has yet been found which provides all of the desirable properties to the extent required by certain applications. For example, the electrical industry has been in need of a wire coating which would have flexibility, overload resistance, cut-through and abrasion resistance even superior to the best known wire enamels and varnishes, such as those prepared from individual polyimides.

According to this invention there is provided an article coated with multiple layers of resins which in cooperation with each other impart a unique combination of properties to the coated article, including flexibility, electrical insulation, cut-through resistance and abrasion resistance. One or more of the coating layers is (A) a cured polyamide-imide resin formed from an uncured or incompletely cured polyamide-imide or polyamide-imide precursor and having an inherent viscosity of at least 0.2; and one or more additional coating layers is (B) a polyimide such as formed by curing a polyamide acid condensation product of pyromellitic dianhydride and an aromatic diamine such as oxydianiline.

Polyimides having properties comparable to the polyimide formed by reacting pyromellitic dianhydride and oxydianiline but prepared from other dianhydrides or other aromatic diamines can also be utilized for the (B) coating but the polyimide from pyromellitic dianhydride and oxydianiline is preferred due to its outsanding physical and electrical properties and will be referred to herein for convenience in describing the invention. Other useful polyimides are those disclosed in U.S. 3,179,633 and 3,179,634. Their precursor compositions are disclosed in U.S. 3,179,614. A very important utility for the composite coating of this invention is electrical insulation and the invention will be described with particular reference to wire coatings but other applications for the outstanding coatings of this invention will be apparent to those skilled in the coating and impregnating art.

In practicing this invention an electrical conductor, which can be a wire, combination of wires or assembly thereof or any article requiring a coating having the superior properties provided by this invention, is coated with one or more layers of a polyamide-imide resin or polyamide-imide precursor composition and this coating is cured either chemically or by heat. Thereafter one or more layers of polyimide precursor composition is coated over the cured polyamide-imide coating and this outer coating is then cured to form a polyimide overcoat. Each coating is cured before being overcoated with itself or with another composition. The (A) coating can be the inner or the outer coating but superior performance is obtained when the polyamide-imide (A) coating is the overcoat.

The polyamide-imide compositions used in producing the cured (A) coatings of this invention are solutions or dispersions of polyamide-imides or polyamide acids convertible to polyamide-imides, such polyamide acids including polyamide-imide amic acids, polyamide amic acids and solutions of polyamide-ester acids, but any fluid resin compositions which upon thermal or chemical treatment can be converted to a polyamide-imide are useful for forming the (A) coatings of the electrical conductor in accordance with this invention. Thus the compositions and procedures of U.S. 3,049,518, U.S. 3,179,635, U.S. 2,421,024 and British 570,858 can be used and the disclosures of these patents are incorporated into this specification for the purpose of illustrating polyamide-imide precursor materials useful herein.

A particularly preferred polyamide-imide solution for use herein is produced by the direct reaction of trimellitic anhydride with an aromatic diamine such as methylene dianiline at about 60–80% solids concentration in the presence of a catalyst such as boric acid at 220–230° C. Esters of trimellitic acid anhydride such as the alkyl esters including methyl, ethyl, propyl, butyl, etc., esters and also the phenyl ester of trimellitic acid anhydride can be used in that reaction. A polyamide amic acid solution can be made by reaction of an aromatic diamine such as oxydianiline or methylene dianiline with trimellitic acid chloride and this in converted to a polyamide-imide amic acid and to a polyamide-imide by heating.

The thickness of the (A) and (B) coatings will vary according to the particular end use and the degree of electrical insulation desired. Typically the thickness of the polyamide-imide coating will amount to about 0.5–4.5 mils and the thickness of the polyimide coating will be about 4.5–0.5 mils with the total coating thickness usually not exceeding about 5 mils. Preferably the thickness of the inner coating will be 0.5–2.5 mils and the outer coating about 2.5–0.5 mils.

Because of the extremely well balanced properties of articles of this invention, they are useful in numerous applications where similar articles coated with a single or with multiple coatings of the prior art have been severely deficient in performance characteristics. The articles of this invention are particularly useful in electrical applications requiring class H quality insulation which generally refers to end uses involving exposure to temperatures above 180° C.

The following examples illustrate the invention.

Example 1

A polyamide-imide formed by reacting equimolar proportions of trimellitic anhydride and methylene dianiline in the presence of triethyl phosphite, at 220° C. in N-methyl pyyrolidone at 80% solids and having an inherent viscosity of 0.58 as measured in N-methyl pyrrolidone at 0.5% solids concentration at 25° C. is coated onto #18 copper wire and heat cured in a four pass operation, heat curing being effected after each pass. Approximately a 2 mil coating of the amide-imide is obtained by this treatment. The amide-imide coated wire is subsequently overcoated with a polyamide acid solution formed by reacting pyromellitic dianhydride with oxydianiline in a two pass operation and heat cured after each pass. A one mill polyimide overcoat film is obtained in this manner. The entire operation is carried out continuously by employing a split pan applicator using conventional conditions and curing with heat after each pass. The properties of the coated wire are described in Table I.

Example 2

Using the resins of Example 1 a #18 copper wire is coated with 5 layers of the polyamide-imide and cured to produce a film of 2.4 mils an then overcoated with a single pass of the polyamide acid which cured to a polyimide film of 0.6 mil. The properties of the coated wire are described in Table I.

Example 3

Using the procedure of Example 1 a #18 copper wire is coated with a commercially available polyamide-imide acid prepared from trimellitic acid and methylene dianiline and dissolved in N-methyl pyrrolidone in a four pass operation and cured to produce a 2 mil film. The polyamide-imide coating is overcoated with the polyamide acid in two passes, each followed by heat curing to form a one mil polyimide overcoat film. The properties of the coated wire are described in Table I.

TABLE I

|  | Ex. 1 | Ex. 2 | Ex. 3 |
|---|---|---|---|
| Flexibility: |  |  |  |
| (a) Quick snap [1] | OK | OK | OK |
| (b) Snap and wrap [2] | 3-4X | 5-6X | 3-4X |
| (c) 20% rapid elongation [2] | 1-2X | 2-3X | 1-2X |
| (d) 20% slow elongation [2] | 1X | 2X | 1X |
| Abrasion (ITC) (kg.) | 2.4 | 2.1 | 2.0 |
| Overload (cycles) (110v.) | 50 | 28 | 50-60 |
| Cut-through, °F | 475 | 400 | 500 |

[1] Wire stretched to break instantly. To pass enamel must stretch with wire without cracking.
[2] Diameters around which wire can be wound without cracking. Lower the number the more flexible the enamel.

In each of Examples 1, 2 and 3 the dual coated wires have a balance of properties substantially better than wires coated with the same thickness of either the polyamide-imide or polyimide alone.

Example 4

Using the procedure of Example 1 a polyamide-imide is formed by reacting trimellitic anhydride with methylene dianiline in the presence of triphenyl phosphite. The polymer has an inherent viscosity of 0.55 as measured in N-methyl pyrrolidone in 0.5% solids concentration at 27° C. A polyamide acid solution is prepared by dissolving oxydianiline in N-methyl pyrrolidone and then adding pyromellitic dianhydride to the resulting solution while keeping the temperature below 40° C. The reaction mixture contains one part oxydianiline to 0.98 part pyromellitic dianhydride. The reaction proceeds until a solids concentration of 16.5% is obtained and the solution has a viscosity of 60 poise.

The polyamide acid solution is coated onto #18 copper wire and heat cured in a three-pass operation using conventional wire coating equipment, heat curing being effected after each pass to convert the polyamide acid coating to polyimide. A 1.5 mil coating of polyimide is obtained by this three-pass treatment. The polyimide coated wire is subsequently overcoated with the polyamide-imide solution prepared above in a three-pass operation and heat cured after each pass. This three-pass operation resulted in an overcoat film of 1.5 mils. The entire operation is carried out continuously by employing a split-pan applicator and conventional coating and curing conditions. The properties of the dual coated wire, listed in Table II, are substantially beter than those of the same wire coated with the same thickness of the polyimide alone or the polyamide-imide alone.

Example 5

The procedure and materials of Example 4 are employed except that the polyimide undercoat is applied in a two-pass operation resulting in a coating one mil thick, and the polyamide-imide overcoat is applied in a four-pass operation resulting in an overcoat thickness of two mils and a total coating thickness of three mils. Each layer of coating is cured after each pass using conventional conditions. The properties of the dual coated wire, which are described in Table II, are significantly better than those of the same wire coated with either the same polyimide alone or the same polyamide-imide alone.

TABLE II

|  | Ex. 4 | Ex. 5 |
|---|---|---|
| Flexibility: |  |  |
| (a) Quick snap [1] | OK | OK |
| (b) Snap and wrap [2] | 3-4X | 3-4X |
| (c) 20% rapid elongation [2] | 1X | 1X |
| (d) 20% slow elongation [2] | 1X | 1X |
| Abrasion (ITC) (kg.) | 1.6 | 1.5 |
| Overload (cycles) (110 v.) | 225 | 100 |
| Out-through, °F | 700 | 720 |

[1] Wire stretched to break instantly. To pass enamel must stretch with wire without cracking.
[2] Diameters around which wire can be wound without cracking. Lower the number the more flexible the enamel.

I claim:

1. An electrical conductor coated with multiple resin layers with (A) at least one coating layer consisting essentially of a cured polyamide-imide, and (B) at least one coating layer consisting essentially of a polyimide formed by curing a condensation product of a dianhydride of pyromellitic acid and oxydianiline.

2. The product of claim 1 in which said electrical conductor is a wire.

3. The product of claim 2 in which the polyamide-imide layer is 0.5-4.5 mils thick and the polyimide is 4.5-0.5 mils thick.

4. The product of claim 3 in which the polyamide-imide is formed by reaction of trimellitic acid or a derivative thereof and an aromatic diamine.

5. The product of claim 4 in which the diamine is methylene dianiline or oxydianiline.

6. The product of claim 5 in which the inner coating is 0.5-2.5 mils thick and the outer coating is 2.5-0.5 mils thick.

References Cited

UNITED STATES PATENTS

| 2,421,024 | 5/1947 | Frosch | 117—75 X |
| 3,022,200 | 2/1962 | Koener et al. | 117—218 |
| 3,105,775 | 10/1963 | Lavin et al. | 117—218 X |
| 3,168,417 | 2/1965 | Smith et al. | 117—218 X |
| 3,179,635 | 4/1965 | Frost et al. | 260—78 |
| 3,190,770 | 6/1965 | Lavin et al. | 117—218 |
| 3,220,882 | 11/1965 | Lavin et al. | 117—218 |
| 3,306,771 | 2/1967 | Schmidt et al. | 117—218 |

WILLIAM D. MARTIN, *Primary Examiner.*

R. HUSACK, *Assistant Examiner.*

U.S. Cl X.R.

117—232, 75, 72